June 6, 1944.                C. J. SCHWEBKE ET AL                2,350,643
MACHINE FOR PREPARING FOOD PRODUCTS
Original Filed April 27, 1939      3 Sheets-Sheet 1
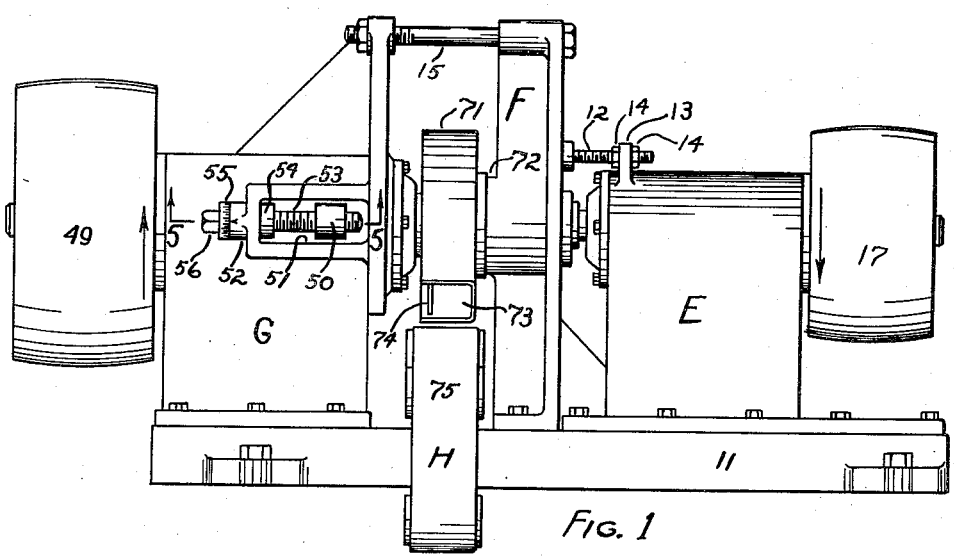
Fig. 1
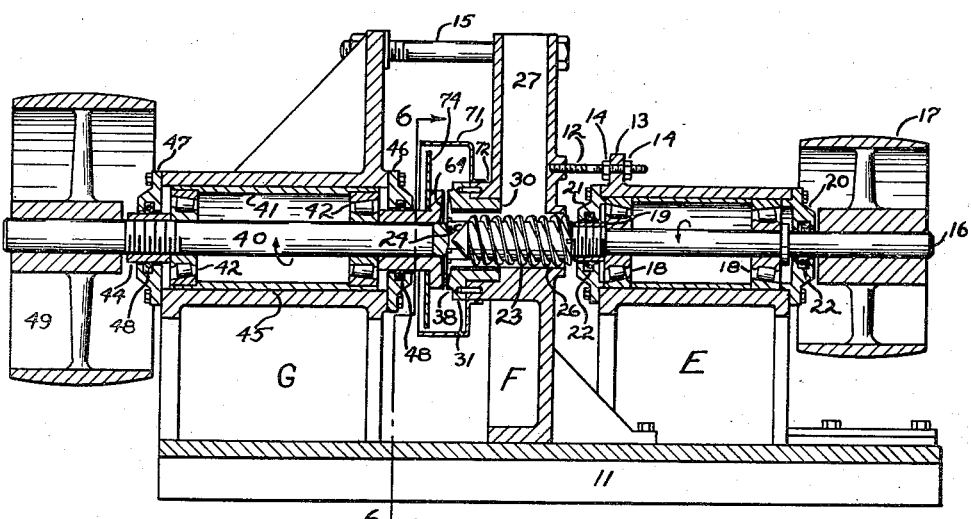
Fig. 2
Fig. 3
INVENTORS
CLARENCE J. SCHWEBKE
FRANK E. HOADLEY
BY *A. S. Kratz*
ATTORNEY

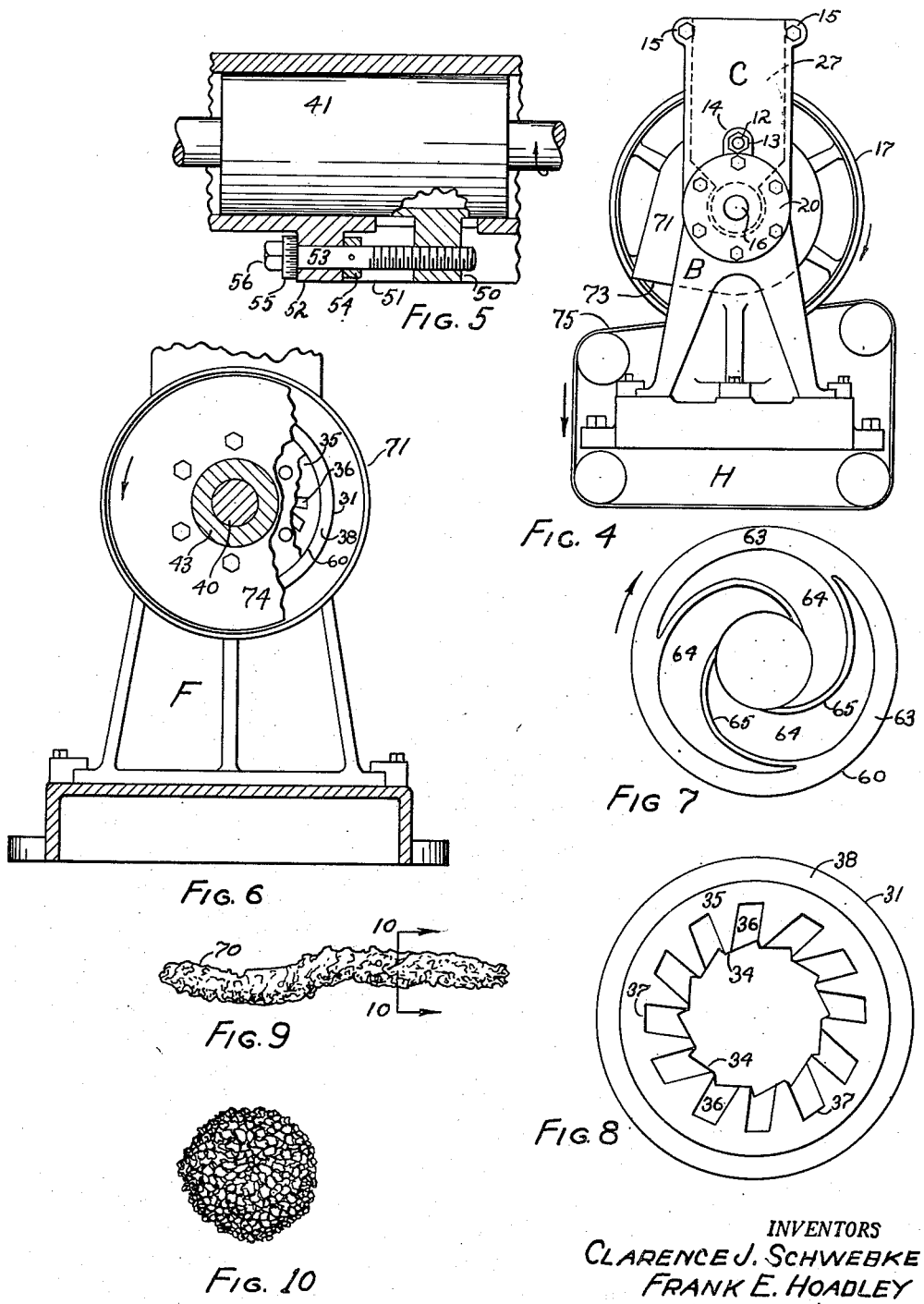

INVENTORS
CLARENCE J. SCHWEBKE
FRANK E. HOADLEY
BY
ATTORNEY

Patented June 6, 1944

2,350,643

UNITED STATES PATENT OFFICE 2,350,643

MACHINE FOR PREPARING FOOD PRODUCTS

Clarence J. Schwebke and Frank E. Hoadley, Beloit, Wis., assignors to Flakall Corporation, South Beloit, Ill., a corporation of Delaware Original application April 27, 1939, Serial No. 270,374. Divided and this application June 10, 1942, Serial No. 446,454

2 Claims. (Cl. 99—238)

It is the intention that the present patent shall cover by suitable expression in the appended claims, features of patentable novelty other than claimed in our pending application issue No. 2,295,868, September 15, 1942, of which this application is a divisional.

The present invention relates to a machine for the treatment or preparing of various raw food products. Such products, for example, as corn meal and the like, wherein, by a step method, the material is first given a predetermined moisture content, mixed and then preferably fed into the final processer by means of a metering device, then stirred, mixed and cooked under pressure so as to first form a homogeneous mass and then a somewhat viscous fluid and then preferably rolling or spinning the fluid between closely spaced smooth annular surfaces and exuding it into atmospheric pressure in a number of streams which are immediately expanded into cellular streamlets or fingers.

In carrying out our invention, we reduce the raw material such as corn meal and the like to a cooked fluid under considerable pressure, the food being left more or less tenacious and containing innumerable infinitesimal particles of water or vapor.

The device preferably is designed so as to be self heated by friction between the particles of the material and between the particles and the surfaces of contacting metal and to progressively build up pressure during the heating period; thus the uncooked raw material, having a predetermined moisture content, is processed into a somewhat viscous liquid having a temperature high enough to cook the mass and heat the water particles to a temperature high enough for evaporation at atmospheric pressure but being under sufficient pressure to prevent it.

In order to accomplish the foregoing results, the food particles must first be humidified, then broken down and cooked under pressure to prevent evaporation of the moisture and agitated to a point where it takes the form of a fluid but having sufficient viscosity to expand into a cellular structure when the pressure is released.

We accomplish the desired results after the material is cooked and liquified by means of two annular smooth surfaces very closely spaced, one turning at a relatively high speed and the other being preferably stationary; thus to cause the mass to whirl as it is exuded from between these surfaces into atmospheric pressure. The expansion of the pent up vapor and released steam forms cells similar to bubbles formed on the surface of soapy water when air is discharged under the surface of the water.

Our device is designed so the necessary heat and pressure are created progressively wherein the control resides in convenient means for controlling the moisture content, and the space between the discs through which the material is exuded.

The raw material seldom contains enough moisture for proper processing. We therefore provide means for adding moisture to the raw material before it is fed into the final processer.

When the streamlets are discharged from the processing apparatus they are prepared for human consumption except that they lack proper seasoning. We provide separate means for the seasoning process. The streamlets are crisp and light and while the surface cells are much smaller than the interior cells, they both readily absorb any desired kind and quantity of seasoning especially when supplied in heated liquid form. The streamlets may be seasoned in the form they come from the processer or they may be broken up into short pieces for the purpose.

To these and other useful ends, our invention consists of parts, combinations of parts, or their equivalents, and mode of operation, as hereinafter described and claimed and shown in the accompanying drawings in which:

Fig. 1 is a side elevation of the preferred form of the major unit of our processing device.

Fig. 2 is a vertical longitudinal section of the device illustrated in Figure 1.

Fig. 3 is an enlarged fractional longitudinal section of the vital parts of our device.

Fig. 4 is a drawing of the device shown in Figure 1 as viewed from the right or stator end.

Fig. 5 is an enlarged horizontal fractional section of the device taken on line 5—5 of Figure 1.

Fig. 6 is a fractional transverse section of the device taken on line 6—6 of Figure 2.

Fig. 7 is a front or face view of the processing rotor.

Fig. 8 is a front or face view of the stator.

Fig. 9 is a perspective view of one of the streamlets about to scale.

Fig. 10 is a section taken on line 10—10 of Figure 9.

Figure 11:
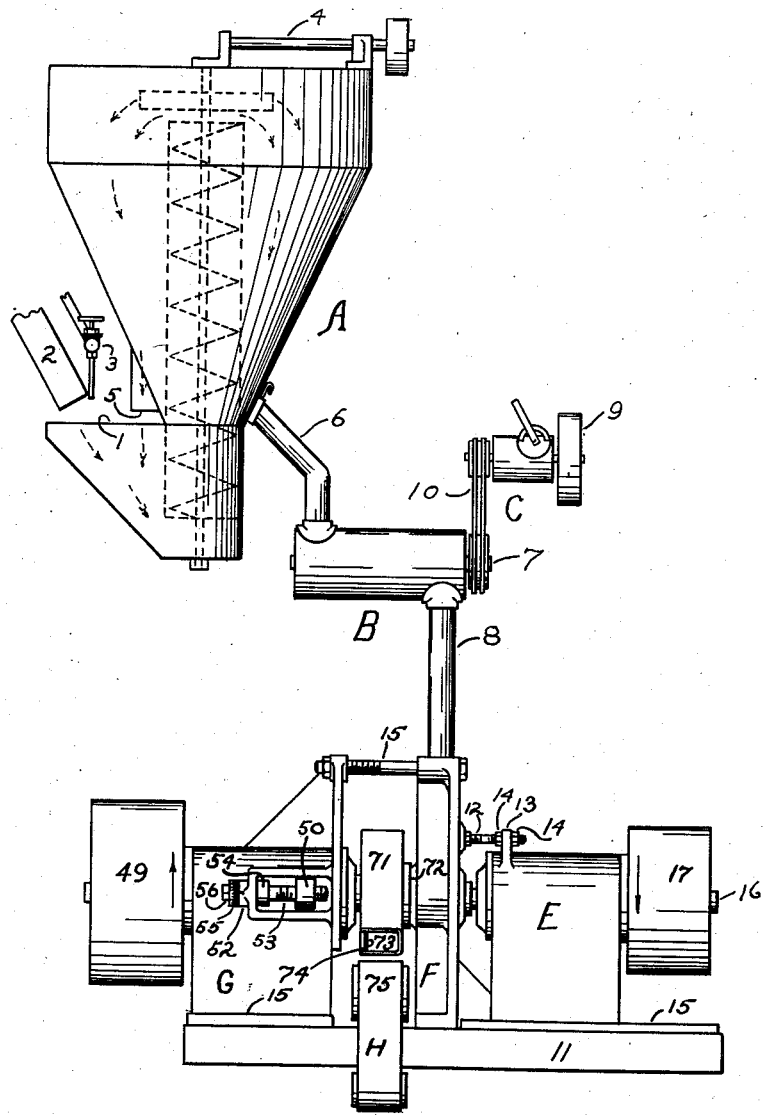
Fig. 11 is a diagrammatic plan view of our complete device.

As thus illustrated, our complete processing device comprises four distinct units (see Figure 11) viz., A, B, C and D each cooperating to produce the results as hereinbefore outlined.

Unit A comprises the ground or comminuted food mixing device which is well known to the trade and is provided with a hopper having an inlet as at 1, into which the raw material may be supplied by means of a spout 2 and having a valve 3 with a connection to a water supply so a desired quantity of water may be allowed to drip into the raw material as it passes into the hopper and before it joins the recirculating material.

The mixing mechanism as shown by dotted lines comprises an auger conveyor which is adapted to be driven by shaft 4 and is surrounded by a conveyor tube, the bottom end terminating a short distance above the bottom of the hopper and the upper end terminating a short distance below the top cover of the mixer. The auger is adapted to stir and move the material from the bottom of the hopper and discharge it into the top of the mixer, the housing permitting it to fall back into the hopper through outlet 5.

Clearly the fresh supply of hydrated material will be thoroughly and uniformly mixed with the recirculated material as it passes rapidly and frequently through the mixer. An outlet 6 is provided which conveys the hydrated material preferably into the auger feeding device B having a driving shaft 7.

Speed changing device C is provided having driving means 9 and mechanism whereby shaft 7 may be driven at various speeds through V-belts 10. Units A, B and C are commercial articles and too well known to require further description except the means provided for hydrating the material before it joins the recirculating material and to state that the raw material, after being hydrated is fed into the processing unit D in any desired quantity per minute through outlet duct 8.

To successfully operate unit D, it is absolutely necessary to provide the raw material with a certain moisture content. The amount of moisture added, for example, to 100 lbs. of raw material varies considerably with the weather.

Commercial corn meal is guaranteed to contain not more than 12% moisture by weight but there is no guarantee as to how much less this material will contain and therefore means are preferably provided (not shown) for testing the moisture content of the material before it reaches unit D. Not only is it necessary to definitely control the moisture content of the raw material but the speed at which it is fed into the processer must be controlled for reasons which will hereinafter appear.

The most satisfactory means for controlling the flow of material is by means of an auger conveyor and a speed changing device as illustrated. Thus clearly, units A, B and C will operate satisfactorily and deliver a desired and continuous quantity of material at the proper humidity to unit D.

Unit D comprises a base 11 on which is mounted a unit which in its entirety is designated by reference character E. This unit is adapted to supply the mixing, heating and pressure necessary for successful operation of the device. Unit F is permanently secured to base 11 and comprises the stationary parts of the processer. Unit G is mounted on base 11 and supplies power to the rotor which acts to exude the cooked liquid material and cause it to form in cellular streamlets and deliver them to a belt conveyor which in its entirety is designated by reference character H.

Unit E is held in spaced relation to unit F by means of bolt 12 which is screw threaded into unit F and passes loosely through lug 13 and is held in the desired position by means of nuts 14—14. Unit G is firmly held in spaced relation to unit F by means of spaced bolts 15—15. Units E and G are firmly held in selective longitudinal positions on base 11 by means of suitable guide straps as clearly illustrated in Figures 1 and 4.

It will be seen that by removing the outer nut 14 and loosening the strap bolts which hold unit E to base 11, this unit may be pulled rearwardly far enough to expose the auger conveyor of this unit. By removing the nuts on bolts 15 and the bolts which clamp unit G to base 11, this unit may also be moved away from unit F in the same manner so as to make the rotor accessible.

Unit E comprises a shaft 16 having a driving pulley 17 secured thereto, the shaft being mounted in the unit by means of bearings 18—18. A sleeve 19 is screw threaded on shaft 16 with which to adjust the bearings.

We provide end members 20 and 21 each being provided with grooves 22—22 for the reception of suitable packing material. We mount a conveyor sleeve 23 on shaft 16, the front end being pointed as at 24, the sleeve having spiral projections 25.

Projections 25 are adapted to fit freely within an orifice 26 in member F. This orifice intersects an inlet duct 27. Member 23 is provided with key seats 28—28 and a driving pin 29 is secured to shaft 16, the ends protruding so as to engage seats 28. Thus when shaft 16 is turned in the direction indicated by curvilinear arrow, the conveyor will tend to move the material from duct 27 toward unit G.

A stator sleeve 30 having a flange 31 is closely fitted into an opening 32 in member B (see Figure 3) and is held from turning therein by means of dowel pins 33—33.

The opening in sleeve 30 is formed by spaced teeth 34. This opening registers with orifice 26. The face 35 of flange 31 is provided with cut-away grooves 36 which terminate as at 37, one edge registering with the leading edge of the teeth; thus leaving a narrow annular smooth surface between grooves 36 and an annular groove 38 which is cut in the face corner of flange 31.

It will be seen that spirals 25 extend into sleeve 30 and that teeth 34 will cooperate with the spirals to move the material being treated and create considerable pressure and frictional heat when the movement of the material is considerably restricted as will hereinafter appear.

Clearly if it is desired to inspect member 23, all that is necessary is to loosen the straps which hold member E to the frame and remove outer nut 14 and move member E toward the end of the frame.

Referring now to unit G. This unit comprises a shaft 40 which is rotatably mounted in a sleeve 41 by means of bearings 42—42, the inner bearing resting against a sleeve 43 and being adjusted by means of a collar 44 which is screw-threaded on the shaft as illustrated.

Sleeve 41 is slidably mounted in an opening 45 in member G. End members 46 and 47 act to form an oil tight chamber each being provided with a groove 48 for the reception of packing material.

A pulley 49 is secured to the protruding end of shaft 40. Sleeve 41 is provided with a screw threaded projection 50 which extends through a slot 51 at the rear of which is a closure 52. A bolt 53 is rotatably mounted in member 52 and screw-threaded into member 50 having a collar 54 and a dial flange 55.

A squared portion 56 is provided in rear of member 55 whereby bolt 53 may be turned by means of a suitable wrench. Member 55 is provided with a number of spaced marks and member 52 is provided with an arrow point whereby sleeve 41 may be moved back and forth definite distances in the housing for purposes which will hereinafter appear.

Sleeve 43 is provided with a flange 60 and is secured to shaft 40 so as to provide a space at the end of the shaft for a filler plug 61. This filler plug is preferably curved on its face as at 62 and is adapted to lie across the end of shaft 40 as indicated so the outer edges of the curve will be flush with the front surface 63 of the flange. The outer periphery of flange 60 registers with the bottom of groove 38.

We provide cut-away portions 64 which are preferably shaped as illustrated in Figure 7 providing curved members 65 so as to cooperate when turning in the direction indicated by arrow with members 25, 34 and 36 to urge the material being processed outwardly through opening 66 between members 63 and 35. This opening is adapted to be adjusted by turning bolt 53 in either direction. In other words, this bolt may be used for minute adjustments of space 66. It will be understood that this space may be changed for various materials; thus the space is always under complete control of the operator. Cut-away portions 64 terminate on the same transverse plane as point 37; thus there will be two annular rings as at 35 and 63.

We provide a housing 71 which is secured to member F as at 72 (see Figures 2 and 4) and having an outlet as at 73. We mount a disc 74 on flange 60 of the rotor thus to direct the streamlets to an endless belt 75. This belt may be supported as illustrated in Figure 4 or in any other suitable manner which will be adapted to convey the streamlets to receptacles or to another conveyor.

By referring to Figure 2 it will be seen that member E may be adjusted to a position which will bring the apex of member 24 in contact with surface 62 of member 61 while surfaces 35 and 63 are in contact. Before starting the rotor, it should be moved slightly out of contact with the stator by turning bolt 53.

When the device is started, the hydrated material is fed into inlet 27 and is moved toward the rotor by spirals 25 and because of the fact that the smooth surfaces of the stator and rotor are almost in contact, pressure and heat will immediately be generated and as the pressure and heat are increased, the material will be violently stirred; thus to form a homogeneous somewhat viscous fluid which will be exuded from between surfaces 35 and 63.

The temperature will raise to a point which would evaporate the water or moisture at atmospheric pressure but full evaporation will be prevented by the pressure generated by spirals 25. As the fluid is exuded from between surfaces 35 and 63, it will form in small streams. These streams will be caused to revolve as they are exuded because one of the surfaces between which the fluid is passing is preferably stationary and the other is revolving at high speed. When the pressure is released, the water or moisture in the fluid will immediately flash into steam and any vapor in the liquid will expand to thereby form cellular streamlets. Clearly grooves 36 and ribs 65 will cooperate with the smooth disc surfaces 35 and 63 to urge the material outwardly and to maintain the pressure until the liquid is, or about to be exuded into the atmosphere.

It will be seen that in order to operate the device, the operator need only to see that the raw material is properly hydrated and fed into the final processer at the right speed and that the stator and rotor surfaces are the right distance apart.

It will be understood that we have illustrated our preferred designs and that many minor detail changes may be made without departing from the spirit and scope of the present invention as recited in the appended claims. For example, in some designs it may be necessary to supply some exterior heat or a cooling medium to member F. It will also be understood that spirals 25 may be differently arranged and shaped and that the grooves and teeth in members 30, 31 and 60 may also be differently designed. Furthermore, the convex face of member 61 or member 24 may be differently designed.

Having thus shown and described our invention, we claim:

1. A device of the class described, comprising an elongated base plate, having mounted thereon, intermediate its ends, a center unit having a stator with an opening therethrough formed by spaced ribs and a feed duct forming an operating connection to said opening, the closed end of said duct registering with a portion of the stator opening, an opening in said duct in axial alignment with said stator opening and having substantially the same diameter as the inside diameter thereof, a carrying element slidably secured to said base adjacent said duct opening and having a shaft rotatably mounted therein and positioned axially within said openings, a spiral conveyor member secured to said shaft and extending through said last opening and a distance in said stator opening, means for driving said shaft in one direction, said stator having on its outer end and at the outer edge thereof, a relatively narrow substantially smooth annular surface, another carrying member mounted on the opposite end of said base plate, a shaft rotatably mounted in said last carrying member and being in substantially axial alignment with said first shaft and having on its inner end a rotor with a smooth annular surface which registers with said stator annular surface, means for manually adjusting said last shaft longitudinally whereby the space between said annular surfaces may be minutely adjusted, means for driving said last shaft in the opposite direction from said first shaft, projecting ribs on adjacent surfaces of said stator and rotor, the ribs extending inwardly from said annular surfaces and at opposite angles, said spiral conveyor, stator and rotor ribs adapted to urge material fed into said duct toward said annular surfaces and to heat the material by friction and cook it into a viscous mass having a temperature great enough to evaporate the moisture therein at atmospheric pressure but having a pressure high enough to prevent evaporation until after the mass is exuded from between said annular surfaces.

2. A device of the class described, comprising a stator having a substantially uniform circular opening formed by a number of spaced projections, a gravity feed duct operatively connected to one end of said opening, its lower end registering with the opening and having an outlet opening in alignment with said stator opening and being substantially the same diameter thereof, a spiral conveyor positioned in said opening and extending through the bottom of said feed duct and said last opening, means for driving said spiral conveyor in one direction, a rotor adjacent the other end of said stator opening having means to be driven in the other direction, said stator and rotor having on their adjacent outer edges relatively narrow smooth annular registering faces, spaced projections on the adjacent faces of said rotor and stator and extending inwardly from said annular surfaces at opposite angles to thereby cooperate with said spiral conveyor to stir and urge material fed into said duct toward said annular faces, means for manually minutely adjusting said rotor toward and from said stator, whereby the material will be mixed and heated by friction and cooked at a temperature considerably above 212° F. and a pressure created high enough to prevent evaporation of the moisture in the cooked material, and whereby said cooked material will be exuded from between said annular surfaces into the atmosphere.

CLARENCE J. SCHWEBKE.
FRANK E. HOADLEY.